(12) United States Patent
McCorkendale et al.

(10) Patent No.: US 8,504,215 B1
(45) Date of Patent: Aug. 6, 2013

(54) SYSTEMS AND METHODS FOR USING ALTERNATE POWER SOURCES TO MANAGE THE POWER DRAW ON A POWER GRID

(75) Inventors: Bruce McCorkendale, Manhattan Beach, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 624 days.

(21) Appl. No.: 12/264,550

(22) Filed: Nov. 4, 2008

(51) Int. Cl.
*G05D 9/00* (2006.01)

(52) U.S. Cl.
USPC .......................... 700/295; 700/291; 705/412

(58) Field of Classification Search
USPC ................... 700/291, 295; 705/412
See application file for complete search history.

(56) References Cited

U.S. PATENT DOCUMENTS

| | | | |
|---|---|---|---|
| 5,414,640 A | | 5/1995 | Seem |
| 5,528,507 A * | | 6/1996 | McNamara et al. ........... 700/286 |
| 6,289,399 B1 | | 9/2001 | Furuichi et al. |
| 6,384,580 B1 * | | 5/2002 | Ochoa et al. ................ 323/207 |
| 6,747,368 B2 * | | 6/2004 | Jarrett, Jr. ................. 307/31 |
| 6,832,135 B2 | | 12/2004 | Ying |
| 7,360,106 B2 | | 4/2008 | Kato et al. |
| 7,516,342 B2 | | 4/2009 | Jahagirdar et al. |
| 2005/0154499 A1 * | | 7/2005 | Aldridge et al. .............. 700/286 |
| 2006/0149978 A1 | | 7/2006 | Randall et al. |
| 2006/0288241 A1 | | 12/2006 | Felter et al. |
| 2007/0010916 A1 | | 1/2007 | Rodgers et al. |
| 2008/0143489 A1 | | 6/2008 | Castaldo et al. |
| 2008/0189562 A1 | | 8/2008 | McBrearty et al. |
| 2009/0249091 A1 * | | 10/2009 | Goodnow et al. ............. 713/310 |

OTHER PUBLICATIONS

"California ISO: System Status"; (accessed May 18, 2009); http://www.caiso.com/outlook/outlook.html.
"GridPoint: Reshaping the Load Duration Curve"; (accessed May 18, 2009); http://www.gridpoint.com/curve/overview/.
Final Office Action recieved in U.S. Appl. No. 12/208,610, dated Feb. 1, 2012.
Non-Final Office Action received in U.S. Appl. No. 12/208,610, dated Aug. 26, 2011.
Non-Final Office Action received in U.S. Appl. No. 12/208,610, dated Apr. 15, 2011.

* cited by examiner

*Primary Examiner* — Carlos Ortiz Rodriguez
(74) *Attorney, Agent, or Firm* — ALG Intellectual Property, LLC

(57) ABSTRACT

A computer-implemented method for using alternate power sources to manage the power draw on a power grid may comprise: 1) identifying a need to reduce power draw on the power grid, 2) identifying an electrical device that draws power from the power grid, 3) determining that the electrical device is capable of drawing power from an alternate power source, and 4) transmitting a command that, when executed, causes the electrical device to draw power from the alternate power source. A corresponding device-side method for reducing power draw on a power grid may comprise: 1) drawing power from a power grid, 2) receiving a command to draw power from an alternate power source, and then 3) drawing power from the alternate power source. Corresponding systems and methods are also disclosed.

20 Claims, 9 Drawing Sheets

Power-Grid Database 124

| Customer Information 402 | Alternate Power Sources 404 | Electrical Device 406 | Power-Source Capabilities 408 | Alternate Power Source Availability 410 |
|---|---|---|---|---|
| J. Doe<br>123 Main Street<br>Acity, State 12345<br>Account: 123456789 | Battery 234.123.0.1 | Laptop | 56 WHr | Yes |
| M. Smith<br>123 Center<br>Acity, State 12345<br>Account: 987654321 | Battery 234.123.0.2 | Laptop | 56 WHr | Yes |
| | Generator 234.123.0.3 | Refrigerator | 2000 Watts | No |
| | | Oven | | No |
| A. Jones<br>123 W 450 S<br>Acity, State 12345<br>Account: 918273645 | UPS 234.123.1.1 | TV | 500 Watts | Yes |
| | | VCR | | Yes |
| | | DVD | | Yes |
| | Battery 234.123.1.2 | Laptop | 85 WHr | No |
| | Solar Panel 234.123.1.3 | Water Pump | 65 Watts | Yes |
| D. Nelson<br>123 N 450 E<br>Acity, State 12345<br>Account: 546372819 | Generator 234.123.2.1 | Refrigerator | 5000 Watts | Yes |
| | | Oven | | Yes |
| | | Air Conditioner | | No |
| | Battery 234.123.2.1 | Laptop | 70 WHr | No |

*FIG. 4*

Geographic Region 500

| Alternate Power Source 702 | Local Database 122 ||||
|---|---|---|---|---|
| | Electrical Devices 704 | Power Required 706 | Time of Use 708 | Alternate Power Source Availability 710 |
| Battery | Laptop | 19.5 V, 4.62 A | 8:00 AM – 4:00 PM | 8:00 AM – 10:00 AM<br>11:00 AM – 1:00 PM<br>2:00 PM – 4:00 PM |
| | Refrigerator | 120 V, 10 A | 24 Hrs | 7:00 PM – 9:00 AM<br>12:00 PM – 1:00 PM |
| Generator | Oven | 240 V, 10 A | 3:00 PM – 5:00 PM | 3:00 PM – 5:00 PM |
| | Washing Machine | 120 V, 10 A | 9:00 AM – 12:00 PM | 9:00 AM – 12:00 PM |
| | Air Conditioner | 240 V, 10 A | 1:00 PM – 7:00 PM | 1:00 PM – 3:00 PM<br>5:00 PM – 7:00 PM |

*FIG. 7*

SYSTEMS AND METHODS FOR USING ALTERNATE POWER SOURCES TO MANAGE THE POWER DRAW ON A POWER GRID

BACKGROUND

Conventional power-management schemes typically manage the power usage of a computing device by determining whether, and to what extent, a user is currently using the computing device. For example, during periods of inactivity, a power-management scheme may cause a computing device to reduce its power consumption. Conversely, when usage peaks, such schemes may increase the power consumption of the computing device to ensure maximum performance.

While conventional power-management schemes may provide the most optimal experience for users, these schemes fail to account for the impact of a device's power usage on a power grid. For example, when a high number of computing devices simultaneously draw power from a power grid, the collective draw of the computing devices may contribute to spikes on the power grid. Some researchers have even estimated that active computing devices (i.e., computing devices that are not in some form of sleep mode) within a single state may collectively draw as much as 322 Megawatts of power from a regional power grid during peak hours, which is the usage equivalent of approximately 200,000 households.

Unfortunately, if a high number of computing devices simultaneously draw power from a power grid, the power grid may experience unnecessary strain. This may require power-grid operators to impose rolling blackouts to reduce power draw and maintain power availability for a majority of customers.

SUMMARY

As will be described in greater detail below, the instant disclosure generally relates to systems and methods for managing and reducing the power draw on a power grid by utilizing alternate power sources, such as uninterruptible power supplies and laptop batteries. In one example, such a method may comprise: 1) identifying a need to reduce the power draw on a power grid (such as a regional power grid or independent local grid used to power a data center or company campus), 2) identifying at least one electrical device (such as a laptop) that draws power from the power grid, 3) determining that the electrical device is capable of drawing power from at least one alternate power source (such as the laptop's internal battery, an uninterruptible power supply, or a generator), and then 4) transmitting a command that, when executed, causes the electrical device to draw all or a portion of its power from the alternate power source. Logic for executing this method may be implemented in the electrical devices themselves, in the alternate power sources, or in combinations of the same.

In order to avoid a sudden power surge on the power grid when multiple alternate power sources simultaneously become unavailable (such as when a number of laptop batteries, uninterruptible power supplies, or generators simultaneously run out of power), the power grid may: 1) spread out commands geographically, 2) request varied levels of power draw between the alternate power sources and the power grid (e.g., request that a laptop draw sixty percent of its power from its internal battery and the remaining forty percent from the grid), or 3) combinations of the same. Balancing the power draw on the power grid in this manner may allow power-grid operators to flexibly and granularly manage the load on the power grid.

In one example, the power grid may identify the geographic location of an electrical device or alternate power source using geo-location information based on, for example, IP addresses, MAC addresses, or customer-account address information. In addition, the power company may offer incentives to customers for participating in this power-management system. For example, the power company may provide power to a participating customer at a discounted rate or subsidize the purchase of an alternate power source, such as an uninterruptible power supply (UPS).

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a block diagram illustrating information that may be stored in a power-grid database according to at least one embodiment.

FIG. 7 is a block diagram illustrating information that may be stored in a local database according to at least one embodiment.

Figure 1:
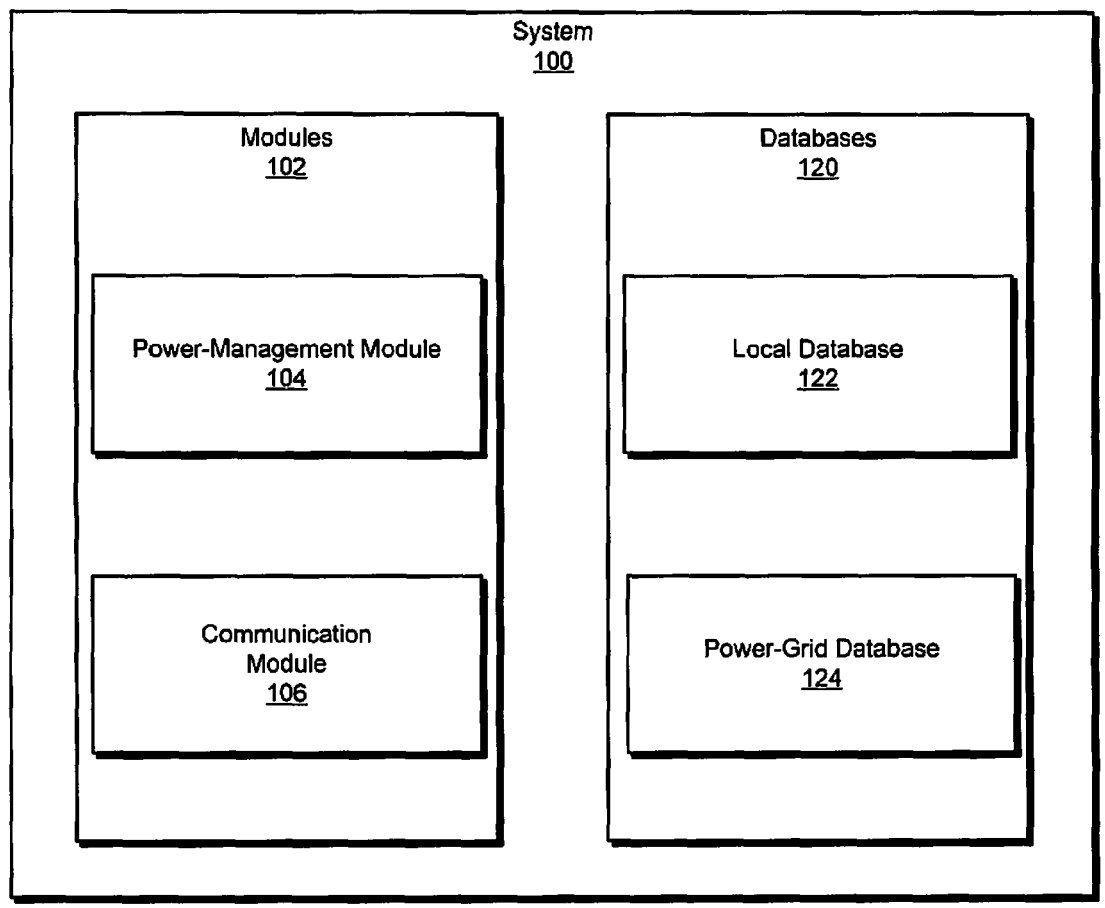
FIG. 1 is a block diagram of an exemplary system for managing power draw on a power grid by using alternate power sources according to at least one embodiment.

Throughout the drawings, identical reference characters and descriptions indicate similar, but not necessarily identical, elements. While the exemplary embodiments described herein are susceptible to various modifications and alternate forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternates falling within the scope of the appended claims.

DETAILED DESCRIPTION OF EXEMPLARY EMBODIMENTS

As will be described in greater detail below, the instant disclosure generally relates to systems and methods for using alternate power sources to manage the draw on a power grid. The phrase "power grid," as used herein, generally refers to any power transmission system comprising at least one power source (e.g., power plants, electrical generators, solar panels, batteries, and battery arrays), at least one power consumer (e.g., computers and refrigerators), and at least one transmission line facilitating the flow of electricity from source to consumer. Examples of power grids include, without limitation, commercial power systems (such as regional power grids), independent power systems (such as independent local grids used to power, for example, data centers, company campuses, or university campuses), or the like.

Figure 2:
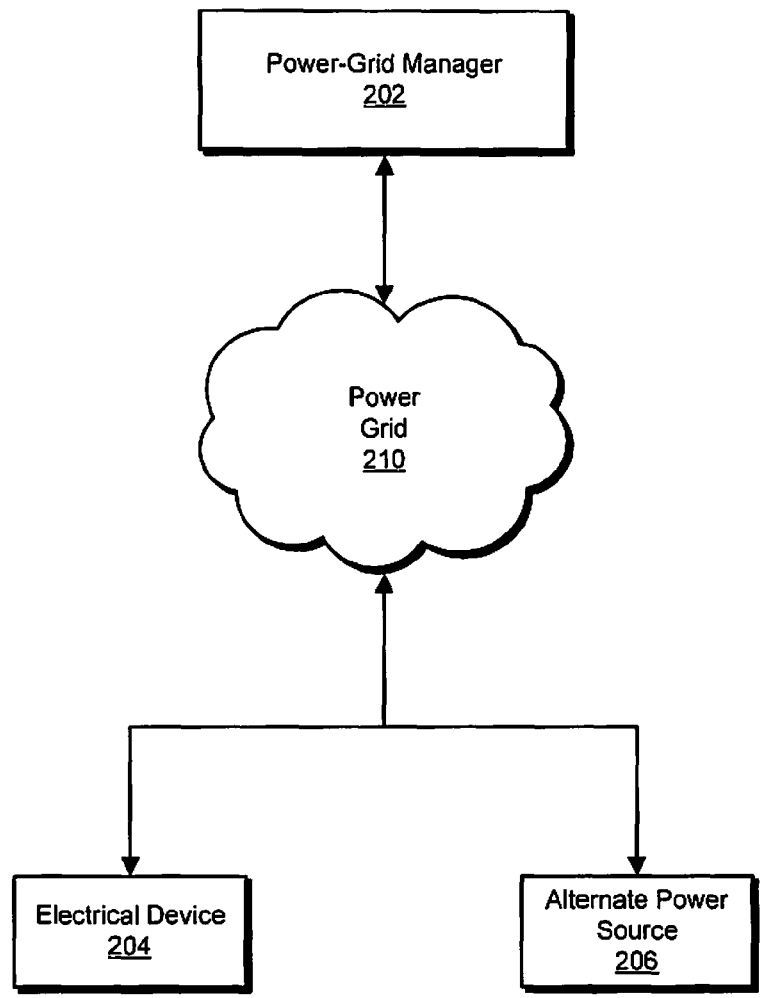
FIG. 2 is a block diagram of an exemplary system for managing power draw on a power grid by using alternate power sources according to at least one embodiment.

The following will provide, with reference to FIGS. 1 and 2, detailed descriptions of exemplary systems for managing the draw on a power grid by using alternate power sources. Detailed descriptions of corresponding exemplary computer-implemented methods will also be provided in connection with FIGS. 3-7. In addition, descriptions of an exemplary computing system and network architecture capable of implementing one or more of the embodiments described and/or illustrated herein will also be provided in connection with FIGS. 8 and 9.

FIG. 1 is a block diagram of an exemplary system 100 for using alternate power sources to manage the power draw on a power grid. As illustrated in this figure, exemplary system 100 may comprise one or more modules 102 for performing one or more tasks. For example, system 100 may comprise a power-management module 104 for managing the power draw on a power grid. System 100 may also comprise a communication module 106 for controlling communication between a power grid, devices that draw power from the power grid, and/or various alternate power sources.

In certain embodiments, one or more of modules 102 in FIG. 1 may represent one or more software applications or programs that, when executed by a computing device, may cause the computing device to perform one or more tasks required to manage the power draw on a power grid by using alternate power sources. For example, as will be described in greater detail below, one or more of modules 102 may represent software modules programmed to run on one or more computing devices, such as power-grid manager 202, electrical device 204, and alternate power source 206 in FIG. 2, exemplary computing system 810 in FIG. 8, and/or portions of exemplary network architecture 900 in FIG. 9. One or more modules 102 in FIG. 1 may also represent all or portions of one or more special-purpose computers.

As detailed above, system 100 may also comprise one or more databases 120. In certain embodiments, databases 120 may comprise a local database 122 for locally storing information about electrical devices and alternate power sources connected to the power grid. Databases 120 may also comprise a power-grid database 124 for storing information that may be used to determine whether electrical devices are capable of drawing power from alternate power sources. As will be described in greater detail below, power-management module 104 may use information stored in power-grid database 124 and local database 122 to determine when electrical devices connected to a power grid should draw power from alternate power sources.

One or more of databases 120 in FIG. 1 may represent data stored on one or more computing devices. For example, one or more of databases 120 may represent data stored on power-grid manager 202, electrical device 204, and alternate power source 206 in FIG. 2, exemplary computing system 810 in FIG. 8, and/or portions of exemplary network architecture 900 in FIG. 9. Alternately, one or more of databases 120 in FIG. 1 may represent one or more physically separate devices capable of being accessed by a computing device, such as power-grid manager 202, electrical device 204, and alternate power source 206 in FIG. 2, exemplary computing system 810 in FIG. 8, and/or portions of exemplary network architecture 900 in FIG. 9.

FIG. 2 is a block diagram of an exemplary system 200 for managing the power draw on a power grid by using alternate power sources. As illustrated in this figure, exemplary system 200 may comprise a power-grid manager 202 in communication with an electrical device 204 and an alternate power source 206 via a power grid 210 (using, for example, power line communication technology, such as Ethernet over power lines). Although not illustrated in FIG. 2, power grid manager 202 may also communicate with electrical device 204 and/or alternate power source 206 via a communications network, such as exemplary network architecture 910 in FIG. 9. As detailed below, examples of such networks include, without limitation, an intranet, a wide area network (WAN), a local area network (LAN), a personal area network (PAN), the Internet, a cellular network (i.e., GSM network), wireless communication networks (e.g., WIFI), radio communication networks, or the like.

Power-grid manager 202 may represent any device or module capable of managing power draw on a power grid. In certain embodiments, power-grid manager 202 may comprise one or more portions of exemplary system 100 in FIG. 1. For example, one or more of modules 102 may be stored and configured to run on power-grid manager 202. Similarly, one or more of databases 120 may represent portions of power-grid manager 202.

Electrical device 204 generally represents any type or form of device that consumes electricity. Examples of electrical device 204 include, without limitation, computers (e.g., laptops and desktops), appliances (e.g., refrigerators and ovens), lights and lighting systems, heating and cooling systems (e.g., air conditioners), electronic devices (e.g., cellular phones, personal digital assistants, digital cameras, and multimedia players), and any other device that requires electricity to operate.

Alternate power source 206 generally represents any source, other than a primary power grid, that may provide power to an electrical device. Examples of alternate power source 206 include, without limitation, internal and external batteries, generators, solar panels, UPS', fuel cells, capacitors, or any other object capable of supplying power to electrical devices. An alternate power source may provide power to a single electrical device or a plurality of electrical devices. For example, a laptop may draw power from its internal battery, while a generator may supply power to all electrical devices (such as a refrigerator and an oven) within a residence.

Power grid 210 generally represents any type or form of power transmission system. In one embodiment, power grid 210 may supply power to, and/or communicate with, (using, for example, power line communication technology) electrical device 204 and/or alternate power source 206.

In certain embodiments, electrical device 204, alternate power source 206, and/or power grid 210 may comprise one or more portions of exemplary system 100 in FIG. 1. For example, one or more of modules 102 may be stored and programmed to run on electrical device 204, alternate power source 206, and/or power grid 210. Similarly, one or more of databases 120 may represent portions of electrical device 204, alternate power source 206, and/or power grid 210.

Although illustrated as separate devices, in some embodiments electrical device 204 and alternate power source 206 may represent a single device. For example, an electrical device (such as a laptop) may contain an alternate power source (such as an internal battery). Similarly, an alternate power source (such as a UPS) may draw power from a power grid, and thus represent, in some sense, an electrical device.

Figure 3:
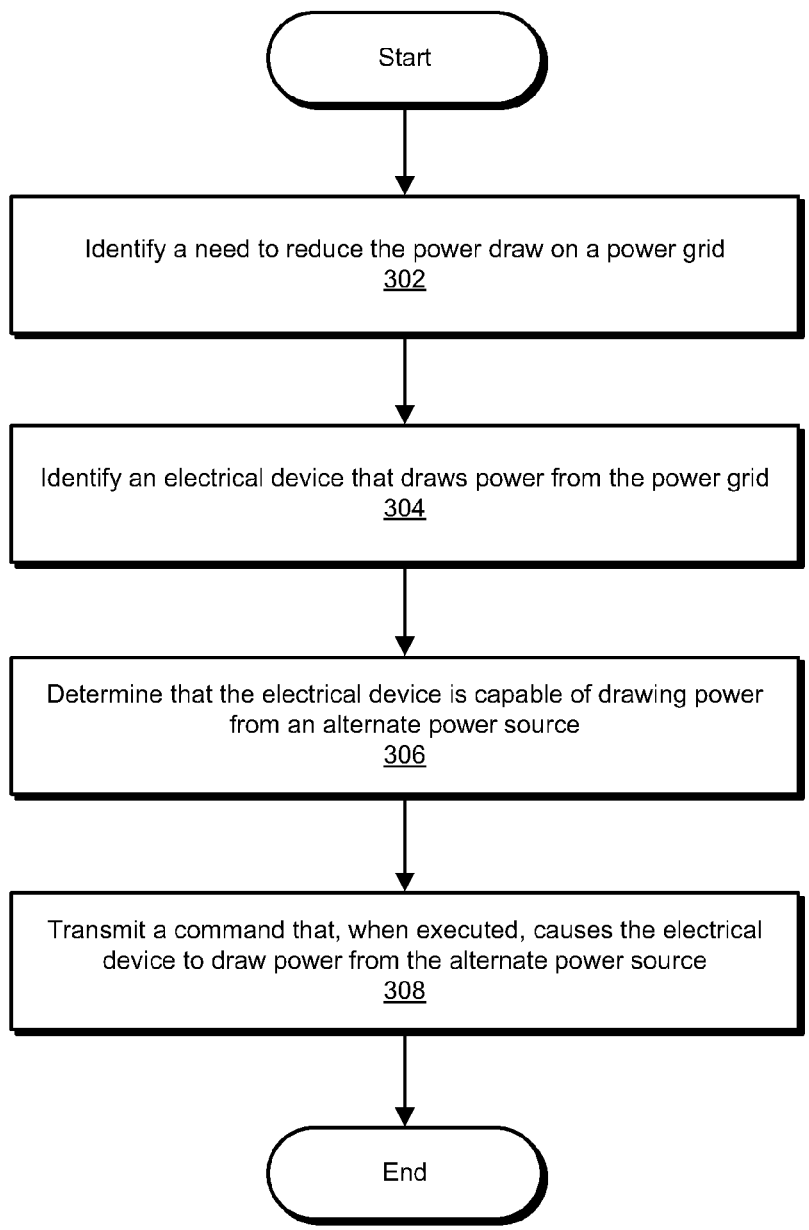
FIG. 3 is a flow diagram of an exemplary computer-implemented method for managing power draw on a power grid by using alternate power sources according to at least one embodiment.

FIG. 3 is a flow diagram of an exemplary computer-implemented method 300 for using alternate power sources to manage the power draw on a power grid. As illustrated in this figure, at step 302 the system may identify a need to reduce the power draw on a power grid. For example, power-grid manager 202 in FIG. 2 (which may, as detailed above, comprise power-management module 104 in FIG. 1) may identify a need reduce the power draw on power grid 210.

The system may perform step 302 in a variety of ways. In one example, power-grid manager 202 in FIG. 2 may determine that the power draw on power grid 210 exceeds a predefined power-draw threshold. For example, when the power draw on power grid 210 exceeds seventy percent of the grid's power capacity, power-grid manager 202 may determine that the power draw on power grid 210 should be reduced.

In another example, power-grid manager 202 in FIG. 2 may determine that the power draw on power grid 210 should be reduced during times of peak power draw. For example, power-grid manager 202 may determine that the power draw on power grid 210 peaks at 3:00 PM every weekday. In this example, power-grid manager 202 may determine that power draw on power grid 210 should be reduced between 2:00 PM and 4:00 PM every weekday. In an additional example, power-grid manager 202 may determine that the power draw on power grid 210 should be reduced simply to conserve energy.

Returning to FIG. 3, at step 304 the system may identify at least one electrical device that draws power from the power grid. For example, power-grid manager 202 in FIG. 2 may determine that electrical device 204 draws power from power grid 210.

At step 306 in FIG. 3, the system may determine whether the electrical device identified in step 304 is capable of drawing power from at least one alternate power source. For example, power-grid manager 202 in FIG. 2 may determine whether electrical device 204 may draw power from alternate power source 206.

The system may perform step 306 in a variety of ways. In one example, power-grid manager 202 (which may, as detailed above, comprise communication module 106 in FIG. 1) may receive a message from electrical device 204 and/or alternate power source 206 that indicates that electrical device 204 is capable of drawing power from alternate power source 206.

In an additional example, power-grid manager 202 may determine whether electrical device 204 is capable of drawing power from an alternate power source by analyzing information stored in a database, such as power-grid database 124 in FIG. 1. FIG. 4 is an illustration of an exemplary power-grid database 124 containing information that may be used to determine whether an electrical device is capable of drawing power from an alternate power source. As illustrated in this figure, power-grid database 124 may contain information that identifies a customer account associated with an electrical device (column 402), alternate power sources from which the electrical device may draw power (column 404), a description of the electrical device (column 406), the amount of power that may be provided to the electrical device by the alternate power sources (column 408), and whether the alternate power sources are currently capable of supplying power to the electrical device (column 410).

Although not illustrated, power-grid database 124 may also contain information that identifies an amount of power required by the electrical device, a schedule of when the electrical device requires power, preferred means or channels for communicating with the electrical device and/or alternate power sources, the availability of such communication means or channels, how to address commands to such communication means or channels (e.g., IP address or telephone number), and/or any other potentially useful information.

As detailed above, power-grid manager 202 may determine whether electrical device 204 is capable of drawing power from an alternate power source by analyzing information stored in power-grid database 124. For example, power-grid manager 202 may, by analyzing the information stored in power-grid database 124, determine that a laptop associated with customer account number "123456789" (for "J. Doe" at "123 Main Street" in "Acity, State 12345") is capable of drawing up to 56 WHr of power from the laptop's internal battery. Power-grid manager 202 may also determine that the laptop may currently draw power from its internal battery since, per column 410 in power-grid database 124, the battery is currently available as an alternate power source (which, in this example, may mean that the battery is fully or at least partially charged).

Similarly, power-grid manager 202 may determine that a refrigerator and oven associated with customer account number "987654321" (for "M. Smith" at "123 Center" in "Acity, State 12345") are capable of drawing up to 2000 Watts from a generator. However, in this example, power-grid manager 202 may determine that the refrigerator and oven may not currently draw power from this generator since, per column 410, the generator is not currently available as an alternate power source (which, in this example, may mean that the generator is out of gas or otherwise inoperable).

The information stored in power-grid database 124 may be input by an administrator or received from customers, electrical devices, or alternate power sources. For example, the availability information stored in column 410 in power-grid database 124 for the UPS associated with customer account number "918273645" (which, in this example, indicates that the UPS is currently available as an alternate power source for the TV, VCR, and DVD player associated with this customer account) may be based on communications received from the TV, VCR, DVD player, the UPS itself, and/or the customer "A. Jones."

In some examples, power-grid database 400 may also contain geo-location information for electrical devices and alternate power sources. The phrase "geo-location information," as used herein, may refer to information that may identify, or may be used to identify, the geographic location of an electronic device or alternate power source. Examples of geo-location information include, without limitation, IP addresses, MAC addresses, RFIDs, GPS coordinates, and other locating information. For example, the IP address 234.123.1.1 may be associated with a UPS associated with customer account "918273645."

Returning to FIG. 3, at step 308 the system may transmit a command that, when executed, causes the electrical device identified in step 304 to draw power from the alternate power source identified in step 306. For example, power-grid manager 202 in FIG. 2 may transmit a command that, when executed, may cause electrical device 204 to draw all or a portion of its power from alternate power source 206 (as opposed to drawing power solely from power grid 210). Upon completing step 308, exemplary method 300 in FIG. 3 may terminate.

The system may perform step 308 in a variety of ways. In one example, power-grid manager 202 may transmit (either via power grid 210 or a separate communications network, as detailed above) the command directly to electrical device 204. Upon receiving the command, electrical device 204 may begin drawing all or a portion of its power from alternate power source 206. For example, power-grid manager 202 may transmit a command to a laptop computer that directs the laptop to draw power from its internal battery. Upon receiving and executing the command, the laptop may commence drawing at least a portion of its required power from its internal battery.

In some examples, the command may cause the electrical device to simultaneously draw, using any suitable ratio, power from both the power grid and the alternate power source. For example, power-grid manager 202 may transmit a command that causes a laptop to draw fifty percent of its required power from its internal battery and the remaining fifty percent from power grid 210.

In an additional example, the system may transmit the command to an alternate power source that is capable of providing power to one or more electrical devices. For example, power-grid manager 202 in FIG. 2 may transmit a command to a UPS (to which a plurality of electrical devices may be connected). Upon receiving the command, the UPS may begin drawing all or a portion of its power from its internal battery, as opposed to drawing power solely from power grid 210. In this example, the electrical devices connected to the UPS (such as a computer or printer) may, in turn, draw at least a portion of their power from the UPS' internal battery, as opposed to drawing power solely from power grid 210 via the UPS.

In another example, the system may transmit the command to an alternate power source, which may in turn direct one or more electrical devices connected to the alternate power source to draw at least a portion of their required power from an alternate power source. For example, power-grid manager 202 in FIG. 2 may transmit a command to a UPS, which may in turn transmit commands to the electrical devices connected to the UPS that direct the electrical devices to draw all or a portion of their power from their internal batteries. In this example, upon receiving the commands from the UPS, the electrical devices may begin drawing power from their internal batteries.

In an additional example, the system may transmit the command to a local power manager that manages the power usage of a plurality of electrical devices and alternate power sources. For example, in an example where a local power manager manages the power usage of a company campus, the local power manager may, upon receiving a command from power-grid manager 202: 1) direct a plurality of UPS' on the company campus to begin drawing all or a portion of their power from their internal batteries, 2) direct a plurality of connected laptops on the company campus to draw all or a portion of their power from their internal batteries, and/or 3) direct emergency backup power supplies to supply power to the campus' lighting and air conditioning systems.

The system may transmit commands in a variety of ways. In one example, power-grid manager 202 may transmit a command to a specific electrical device, such as a laptop having IP address 234.123.1.2. In another example, power-grid manager 202 may broadcast commands to all electrical devices within a specific geographic region or of a specific class. For example, power-grid manager 202 may broadcast a command that directs all laptops within the northeast region of a city that are capable of drawing power from alternate power sources to do so. In addition, commands may direct electrical devices to immediately draw power from alternate power sources, to begin drawing power from alternate power sources on a specific date or time, and/or to draw power from alternate power sources for a specific period of time.

In some examples, power-grid manager 202 in FIG. 2 may determine whether to command an electrical device (or an alternate power source that provides power to electrical devices) to draw power from an alternate power source based on the geographic location of the electrical device. For example, power-grid manager 202 may group electrical devices having the IP address prefix 234.123.X.X into a geographic region 500 in FIG. 5. Similarly, power-grid manager 202 may group: 1) electrical devices having the IP address prefix 234.123.0.X into a first geographic sub-region 502, 2) electrical devices having the IP address prefix 234.123.1.X into a second geographic sub-region 504, and 3) electrical devices having the IP address prefix 234.123.2.X into a third geographic sub-region 506.

Grouping electrical devices into geographic regions and sub-regions in this manner may allow power-grid manager 202 in FIG. 2 to balance the power draw on a power grid and thus manage power surges. Such power surges may occur, for example, when a number of alternate power sources within geographic region 500 become unavailable at the same time (e.g., if a number of laptop batteries, UPS', or generators simultaneously run out of power). To avoid this, power-grid manager 202 may command: 1) electrical devices in first geographic sub-region 502 to draw power solely from alternate power sources and 2) electrical devices in second geographic sub-region 504 to draw power solely from power grid 210. As the alternate power sources in first geographic sub-region 502 become unavailable, power-grid manager 202 may command the electrical devices in second geographic sub-region 504 to begin drawing power from alternate power sources.

Power-grid manager 202 in FIG. 2 may also balance the power draw on a power grid by causing a number of electrical devices to simultaneously draw power from both alternate power sources and the power grid. For example, power-grid manager 202 may request that a first laptop draw fifty percent of its power from power grid 210 and the other fifty percent of its power from an alternate power source (such as its internal battery). Power-grid manager 202 may then request that a second laptop draw twenty percent of its power from power grid 210 and the other eighty percent of its power from its internal battery. By varying the power draw between alternate power sources and the power grid, power-grid manager 202 may maintain a constant level of power draw on power grid 210.

Power-grid manager 202 in FIG. 2 may also balance the power draw on a power grid by both spreading out commands geographically and by causing a number of electrical devices to simultaneously draw power from both alternate power sources and the power grid. For example, power-grid manager 202 may command: 1) the electrical devices in first geographic sub-region 502 to draw all of their power from alternate power sources, 2) the electrical devices in second geographic sub-region 504 to draw fifty percent of their power from alternate power sources, and 3) the electrical devices in third geographic sub-region 506 to draw all of their power from power grid 210. As the alternate power sources in first geographic sub-region 502 become unavailable, power-grid manager 202 may command: 1) the electrical devices in second geographic sub-region 504 to draw all of their power from alternate power sources, 2) the electrical devices in third geographic sub-region 506 to draw fifty percent of their power from alternate power sources, and 3) the electrical devices in first geographic sub-region 502 to draw all of their power from power grid 210.

Power-grid manager 202 in FIG. 2 may also balance the power draw on power grid 210 by commanding an increasing number of electrical devices to draw power from alternate power sources as the power draw on power grid 210 increases. For example, power-grid manager 202 may command a first electronic device to draw power from a first alternate power source. As the draw on power grid 210 increases, power-grid manager 202 may command a second electronic device to draw power from a second alternate power source.

Figure 5:
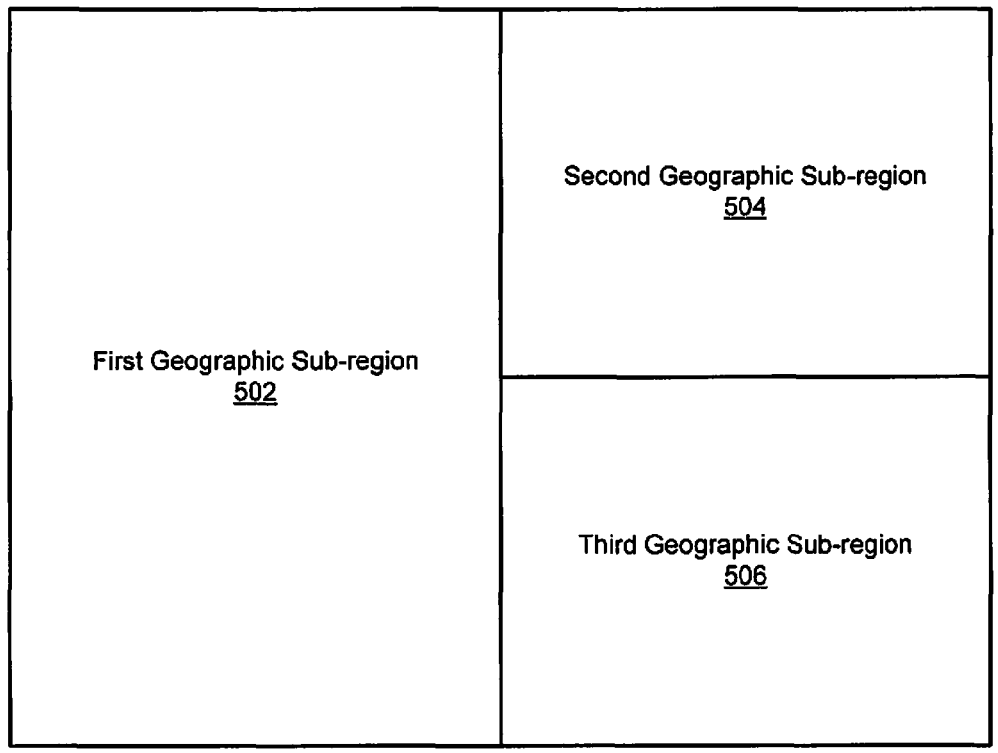
FIG. 5 is a block diagram illustrating geographic regions of a power grid according to at least one embodiment.

In some examples, power-grid manager 202 in FIG. 2 may direct electrical devices within geographic region 500 in FIG. 5 to draw power from alternate power sources during specific times during the day. For example, at certain times during the day, electrical devices in geographic region 500 may draw large amounts of power from power grid 210 in FIG. 2. This may occur when people within geographic region 500 commence certain activities at the same time, such as turning on their computers at work in the morning or starting their air conditioners on a hot afternoon. Power-grid manager 202 may limit the impact of an expected increase in power draw by directing electrical devices within geographic region 500 to draw power from alternate power sources during or before such power draw increases.

In certain embodiments, power-grid manager 202 in FIG. 2 may command an electrical device to draw power from an alternate power source in response to a request from electrical device 204 and/or alternate power source 206. For example, when a UPS' internal battery is fully charged, the UPS may request authorization from power-grid manager 202 to draw power from its internal battery. Power-grid manager 202 may then transmit a command that authorizes the UPS to draw at least a portion of its power from its internal battery.

In some embodiments, power-grid manager 202 in FIG. 2 may attach incentives to customer accounts associated with electrical devices and/or alternate power sources that are capable of executing commands from power-grid manager 202. The term "incentive," as used herein, generally refers to any benefit that may encourage a customer to purchase or use an alternate power source. Examples of incentives include, without limitation, rebates, discounts, subsidies, or any other benefit that may induce a customer to purchase or use an alternate power source. For example, power-grid manager 202 may apply a rebate to a customer's account for purchasing a UPS capable of executing commands from power-grid manager 202.

Figure 6:
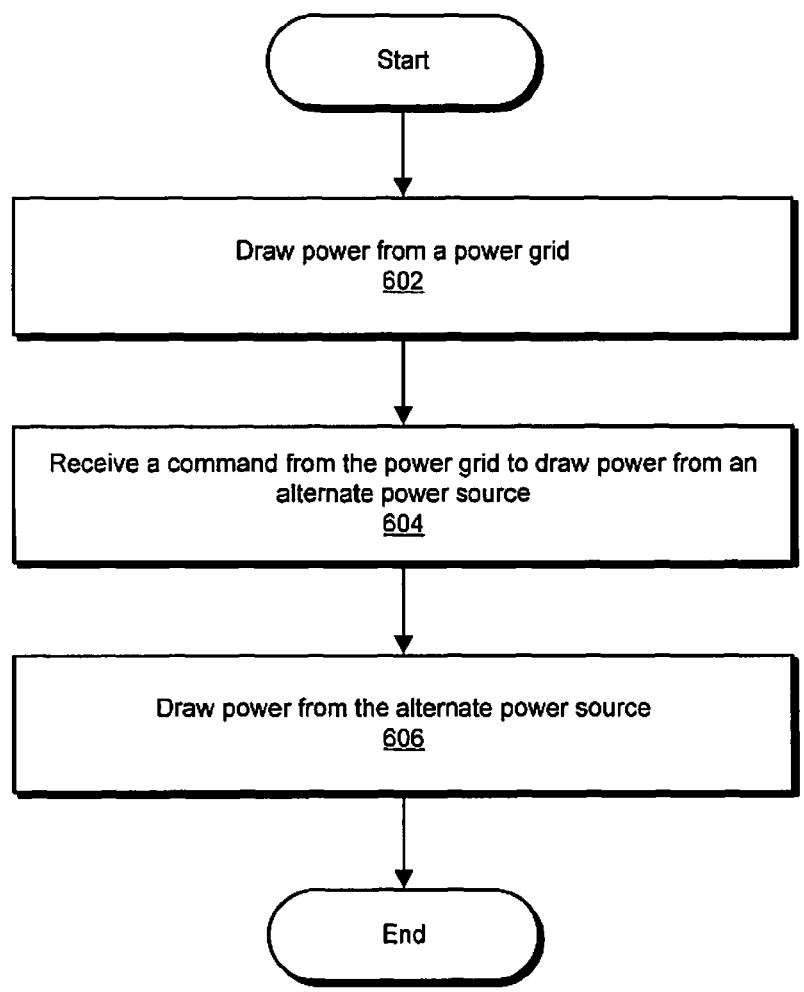
FIG. 6 is a flow diagram of an exemplary computer-implemented method for reducing power draw on a power grid by drawing power from alternate power sources according to at least one embodiment.

FIG. 6 is a flow diagram of an exemplary computer-implemented method 600 for reducing power draw on a power grid by drawing power from alternate power sources. As illustrated in this figure, at step 602 the system may draw power from a power grid. For example, electrical device 204 and/or alternate power source 206 in FIG. 2 may draw power from power grid 210.

At step 604, the system may receive a command from the power grid to draw power from an alternate power source. For example, electrical device 204 and/or alternate power source 206 in FIG. 2 may receive a command from power-grid manager 202 that, when executed, causes electrical device 204 to draw at least a portion of its power from alternate power source 206.

At step 606, the system may draw power from the alternate power source. For example, an electrical device (such as a laptop) may draw all or a portion of its power from an alternate power source (such as an internal battery or a UPS). Similarly, as detailed above, an alternate power source (such as a UPS) may draw all or a portion of its power from its internal battery, which may in turn cause the electrical devices connected to the UPS to draw at least a portion of their power from the UPS. Upon completion of step 606, exemplary method 600 may terminate.

In some examples, the system may, prior to receiving the command to draw power from the alternate power source in step 604, transmit a request to draw power from the alternate power source. For example, when a laptop's internal battery is fully charged, the laptop may request authorization from power-grid manager 202 to draw power from its internal battery. Power-grid manager 202 may then transmit a command that authorizes the laptop to draw at least a portion of its power from its internal battery.

In certain embodiments, electrical device 204 and/or alternate power source 206 in FIG. 2 may gather and store information that may be used by power-grid manager 202 to determine whether electrical device 204 is capable of drawing power from alternate power source 206. FIG. 7 is a block diagram of an exemplary local database 122 that may contain such information. As illustrated in this figure, local database 122 may contain information that identifies one or more alternate power sources (column 702), electrical devices that draw power from the alternate power sources (column 704), the amount of power required by the electrical devices (column 706), a schedule of when the electrical devices draw power (column 708), and a schedule of when the alternate power sources are capable of supplying power (column 710). Power-grid database 122 may also contain any other potentially useful information and may represent data stored on electrical device 204 in FIG. 2, alternate power source 206, or any other local device.

The information contained in local database 122 may be gathered or input by, for example, electrical devices, alternate power sources, and/or customers. For example, a laptop (or UPS to which the laptop is connected) may determine that the laptop requires 19.5 V with a current of 4.62 amps to operate (as shown in column 706). Similarly, a customer may determine that she only operates her oven between 3:00 PM to 5:00 PM every day, while her refrigerator may operate continually (as shown in column 708). In addition, a customer may program a generator to be capable of providing power to a washing machine from 9:00 AM to 12:00 PM during the day (as shown in column 710).

In some examples, the system may compile, based on the information stored in local database 122 in FIG. 7, a local-power-requirements report that contains information that may aid power-grid manager 202 in FIG. 2 in determining whether to cause electrical device 204 to draw power from alternate power source 206. The system may then transmit this local-power-requirements report to power-grid manager 202.

Although not illustrated in FIG. 6, in certain embodiments exemplary method 600 may also comprise, prior to receiving the command to draw power from the alternate power source: 1) determining that the alternate power source is capable of providing power and then 2) notifying the power grid that the alternate power source is capable of providing power. For example, when a laptop determines that its internal is fully charged, the laptop may transmit a notification to power-grid manager 202 in FIG. 2 indicating the same. Power-grid manager 202 may then transmit a command to the laptop that, when executed, causes the laptop to draw at least a portion of its power from its internal battery.

As detailed above, the exemplary systems and methods described herein may effectively manage and reduce the draw on a power grid by causing certain devices on the grid to draw power from alternate power sources. These methods and systems may realize tremendous savings (to both power providers and consumers) and environmental benefits.

Figure 8:
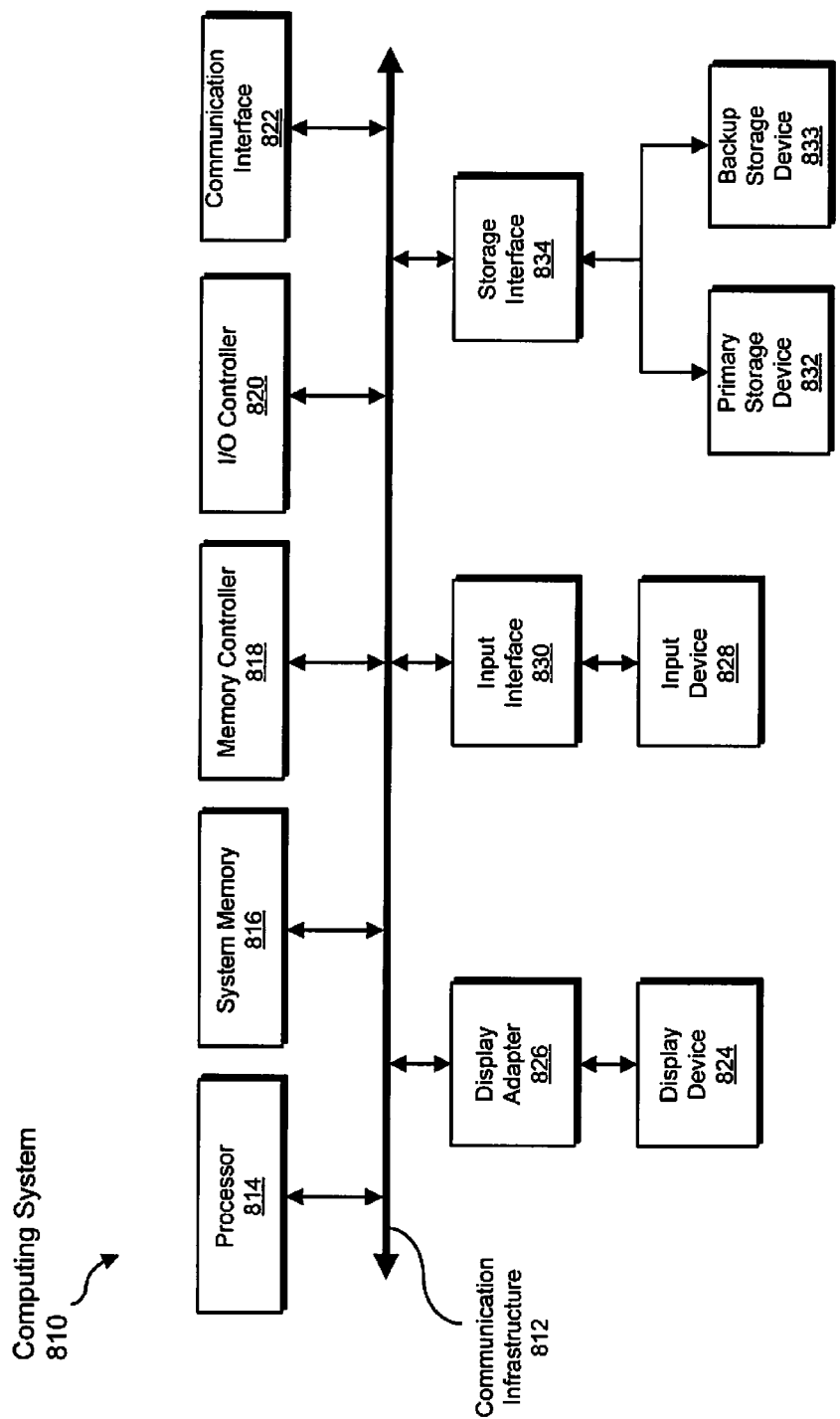
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may comprise at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the identifying, determining, transmitting, receiving, authorizing, associating, attaching, monitoring, balancing, maintaining, drawing, and compiling steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may comprise both a volatile memory unit (such as, for example, system memory 816) and a non-volatile storage device (such as, for example, primary storage device 832, as described in detail below).

In certain embodiments, exemplary computing system 810 may also comprise one or more components or elements in addition to processor 814 and system memory 816. For example, as illustrated in FIG. 8, computing system 810 may comprise a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller 818 may perform and/or be a means for performing, either alone or in combination with other elements, one or more of the steps or features described and/or illustrated herein, such as identifying, determining, transmitting, receiving, authorizing, associating, attaching, monitoring, balancing, maintaining, drawing, and compiling.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for performing, either alone or in combination with other elements, one or more of the identifying, determining, transmitting, receiving, authorizing, associating, attaching, monitoring, balancing, maintaining, drawing, and compiling steps described herein. I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network comprising additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 894 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the identifying, determining, transmitting, receiving, authorizing, associating, attaching, monitoring, balancing, maintaining, drawing, and compiling steps disclosed herein. Communication interface 822 may also be used to perform and/or be a means for performing other steps and features set forth in the instant disclosure.

As illustrated in FIG. 8, computing system 810 may also comprise at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also comprise at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the identifying, determining, transmitting, receiving, authorizing, associating, attaching, monitoring, balancing, maintaining, drawing, and compiling steps disclosed herein. Input device 828 may also be used to perform and/or be a means for performing other steps and features set forth in the instant disclosure.

As illustrated in FIG. 8, exemplary computing system 810 may also comprise a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (i.e., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also comprise other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

In certain embodiments, the exemplary file systems disclosed herein may be stored on primary storage device 832, while the exemplary file-system backups disclosed herein may be stored on backup storage device 833. Storage devices 832 and 833 may also be used, for example, to perform and/or be a means for performing, either alone or in combination with other elements, one or more of the identifying, determining, transmitting, receiving, authorizing, associating, attaching, monitoring, balancing, maintaining, drawing, and compiling steps disclosed herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (i.e., hard disk drives and floppy disks), optical-storage media (i.e., CD- or DVD-ROMs), electronic-storage media (i.e., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternately, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
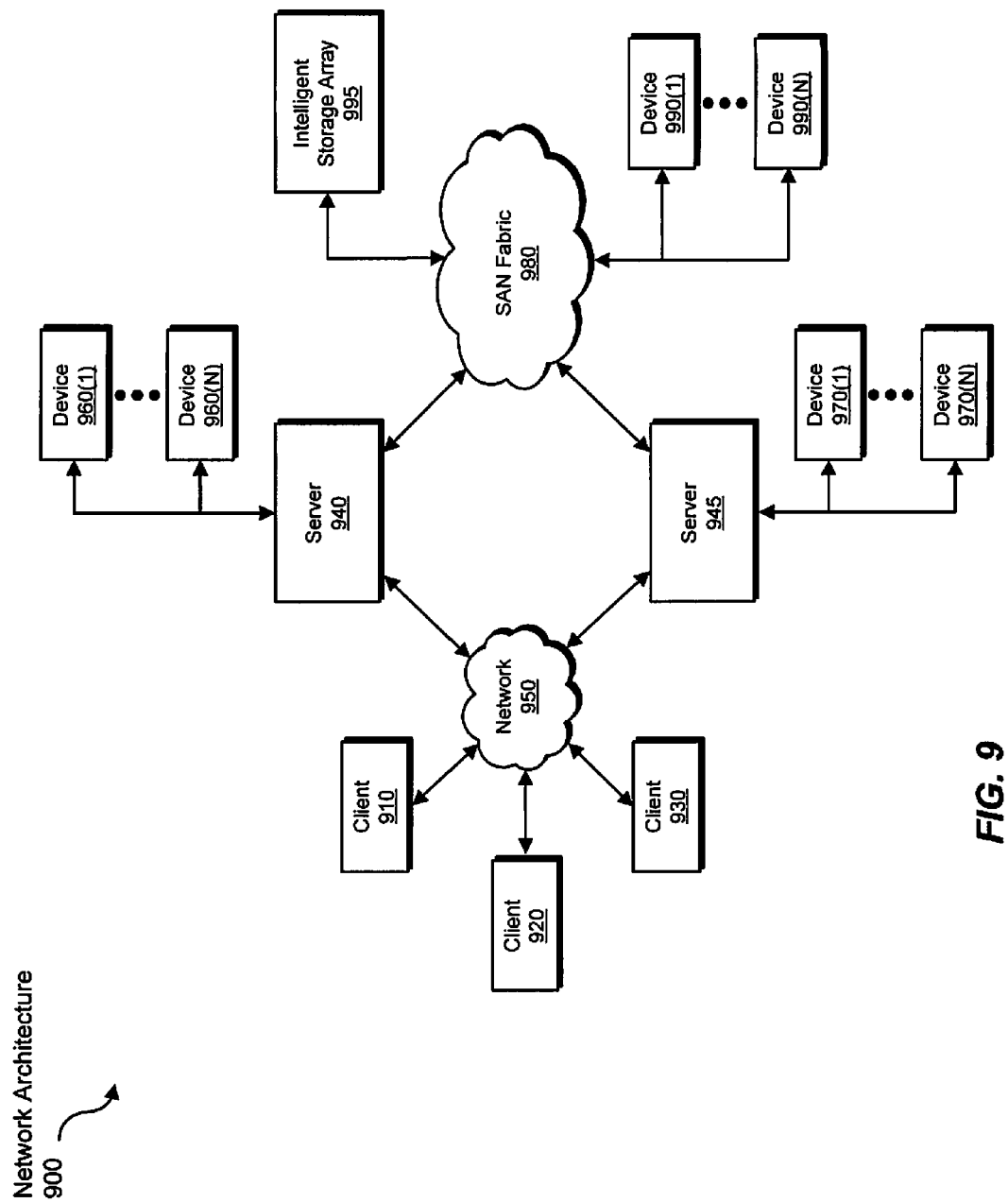
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or to run certain software applications. Network 950 generally represents any telecommunication or computer network; including, for example, an intranet, a wide area network (WAN), a local area network (LAN), a personal area network (PAN), or the Internet.

As illustrated in FIG. 9, one or more storage devices 960 (1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for performing, either alone or in combination with other elements, one or more of the identifying, determining, transmitting, receiving, authorizing, associating, attaching, monitoring, balancing, maintaining, drawing, and compiling steps disclosed herein. Network architecture 900 may also be used to perform and/or be a means for performing other steps and features set forth in the instant disclosure.

As detailed above, computing system 810 and/or one or more of the components of network architecture 900 may perform and/or be a means for performing, either alone or in combination with other elements, one or more steps of the exemplary methods described and/or illustrated herein. For example, a computer-implemented method for managing power draw on a power grid by using alternate power sources may comprise: 1) identifying a need to reduce the power draw on the power grid, 2) identifying at least one electrical device that draws power from the power grid, 3) determining that the electrical device is capable of drawing power from at least one alternate power source, and then 4) transmitting at least one command that, when executed, causes the electrical device to draw power from the alternate power source.

In some examples, transmitting the command may comprise transmitting the command to the electrical device, transmitting the command to the alternate power source, broadcasting the command to electrical devices or alternate power sources within a specific geographic region, and/or broadcasting the command to electrical devices or alternate power sources of a specific class. In addition, the command may cause the electrical device to simultaneously draw power from both the power grid and the alternate power source, to immediately draw power from the alternate power source, to begin drawing power from the alternate power source at a specific date or time, and/or to draw power from the alternate power source for a specific period of time.

The method may also comprise identifying a geographic location associated with the electrical device and determining, based on the geographic location associated with the electrical device, whether to transmit the command. In some examples, the command, when executed, may cause: 1) a first set of electrical devices connected to the power grid to draw power solely from alternate power sources and 2) a second set of electrical devices connected to the power grid to draw power solely from the power grid. The command may also cause a third set of electrical devices connected to the power grid to simultaneously draw power from both the power grid and from alternate power sources. The first and second set of electrical devices may be located within a first and second geographic region, respectively.

In one example, identifying a need to reduce the power draw on the power grid may comprise identifying a power-draw threshold for the power grid and then determining that the power draw on the power grid exceeds the power-draw threshold. The method may also comprising associating the electrical device with a customer account and attaching incentives to the customer account for drawing power from the alternate power source.

The alternate power source may comprise an internal battery, an external battery, an uninterruptible power supply, a generator, a solar panel, a fuel cell, and/or a capacitor. In addition, the power grid may comprise a commercial power grid or an independent power grid.

In one example, the method may further comprise receiving a request for the electrical device to draw power from the alternate power source and then transmitting, in response to the request, the command. The method may also comprise maintaining a database that contains information that identifies a description of the electrical device, a description of the alternate power source, an amount of power required by the electrical device, an amount of power that the alternate power source is capable of supplying, a schedule of when the electrical device draws power, whether the alternate power source is currently capable of supplying power to the electrical device, a customer account associated with the electrical device, a customer account associated with the alternate power source, a geographic location associated with the electrical device, a geographic location associated with the alternate power source, at least one communication channel for communicating with the electrical device or the alternate power source, whether the communication channel is currently available, how to address commands via the communication channel, or any other potentially useful information. In some examples, maintaining the database may comprise receiving information from the electrical device, receiving information from the alternate power source, receiving information from an administrator, and/or receiving information from a customer.

In an additional embodiment, computing system 810 and/or one or more of the components of network architecture 900 may perform and/or be a means for performing, either alone or in combination with other elements, a computer-implemented method for reducing power draw on a power grid by drawing power from alternate power sources. Such a method may comprise: 1) drawing power from the power grid, 2) receiving a command to draw power from an alternate power source, and then 3) drawing power from the alternate power source. The computer-implemented method may also comprise, prior to receiving the command to draw power from an alternate power source, transmitting a request to draw power from the alternate power source.

In a further embodiment, the computer-implemented method may further comprise, prior to receiving the command, determining that the alternate power source is capable of providing power and then notifying the power grid that the alternate power source is capable of providing power.

In a further embodiment, the computer-implemented method may further comprise maintaining a local database that identifies at least one electrical device that is capable of drawing power from the alternate power source, an amount of power required by the electrical device, an amount of power that the alternate power source is capable of supplying, a schedule of when the electrical device draws power, geo-location information associated with the electrical device, geo-location information associated with the alternate power source, or any other potentially useful information. The method may also comprise compiling, based on the local database, a local-power-requirements report, and then transmitting the local-power-requirements report to the power grid.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures may be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for using alternate power sources to manage power draw on a power grid, the method comprising:
   maintaining, by a management device managed by an entity that supplies power via the power grid, a database that identifies a plurality computing devices drawing power from the power grid and a plurality of corresponding battery units currently capable of providing power to the plurality of computing devices;
   storing customer information for each of a plurality of customers in the database, the customer information comprising:
      a description of a customer's computing device;
      a description of a corresponding battery unit;
      a time when the customer's computing device draws power;
      an amount of power required by the customer's computing device;
   identifying, at the management device managed by the entity that supplies power via the power grid, a need to reduce the power draw on the power grid;
   identifying, by analyzing the customer information at the management device managed by the entity that supplies power via the power grid, that at least one of the plurality of computing devices is drawing power from the power grid;
   determining, by analyzing the customer information at the management device managed by the entity that supplies power via the power grid, that the at least one of the plurality of computing devices is capable of, but is not currently, drawing power from at least one of the plurality of corresponding of battery units;
   determining, based at least in part on the customer information at the management device managed by the entity that supplies power via the power grid, at least one ratio for the at least one of the plurality of computing devices to draw power simultaneously from both the power grid and the at least one of the plurality of corresponding battery units; and
   transmitting, from the management device managed by the entity that supplies power via the power grid to a module installed on the at least one of the plurality of computing devices, at least one command that, when executed, causes the at least one of the plurality of computing devices to reduce the drawing of power from the power grid by simultaneously drawing power from both the power grid and the at least one of the plurality of corresponding battery units at the ratio.

2. The computer-implemented method of claim 1, wherein transmitting the at least one command comprises at least one of:
   broadcasting the at least one command to modules installed on computing devices within a specific geographic region;
   broadcasting the at least one command to modules installed on computing devices of a specific class.

3. The computer-implemented method of claim 1, wherein the at least one command causes the at least one of the plurality of computing devices to perform at least one of the following actions:
   immediately draw power from the at least one of the plurality of corresponding battery units;
   begin drawing power from the at least one of the plurality of corresponding battery units at a specific date or time;
   draw power from the at least one of the plurality of corresponding battery units for a specific period of time.

4. The computer-implemented method of claim 1, further comprising:
   identifying a geographic location associated with the at least one of the plurality of computing devices;

determining, based on the geographic location associated with the at least one of the plurality of computing devices, whether to transmit the command.

5. The computer-implemented method of claim 1, wherein the at least one command, when executed, causes:
   a first set of computing devices connected to the power grid to simultaneously draw power from the power grid and a first set of battery units at a first ratio;
   a second set of computing devices connected to the power grid to simultaneously draw power from the power grid and a second set of battery units at a second ratio.

6. The computer-implemented method of claim 5, wherein the command, when executed, further causes a third set of computing devices connected to the power grid to simultaneously draw power from both the power grid and a third set of battery units at a third ratio.

7. The computer-implemented method of claim 5, wherein:
   the first set of computing devices is located within a first geographic region;
   the second set of computing devices is located within a second geographic region.

8. The computer-implemented method of claim 1, wherein identifying a need to reduce the power draw on the power grid comprises:
   identifying a power-draw threshold for the power grid;
   determining that the power draw on the power grid exceeds the power-draw threshold.

9. The computer-implemented method of claim 1, further comprising:
   associating the at least one of the plurality of computing device with a customer account;
   attaching incentives to the customer account for drawing power from the at least one of the plurality of corresponding battery units.

10. The computer-implemented method of claim 1, wherein the at least one of the plurality of corresponding battery units comprises at least one of:
    an internal battery;
    an external battery;
    an uninterruptible power supply.

11. The computer-implemented method of claim 1, wherein the power grid comprises:
    a commercial power grid;
    an independent power grid.

12. The computer-implemented method of claim 1, wherein maintaining the database comprises receiving, at the management device managed by the entity that supplies power via the power grid, a communication that indicates that the at least one of the plurality of computing devices is capable of, but is not currently, drawing power from the at least one of the plurality of corresponding battery units from at least one of:
    the module installed on the at least one of the plurality of computing devices;
    the at least one of the plurality of corresponding battery units.

13. The computer-implemented method of claim 1, wherein the customer information in the database further identifies at least one of:
    an amount of power that the at least one of the plurality of corresponding battery units is capable of supplying;
    a schedule of when the at least one of the plurality of computing devices draws power;
    whether the at least one of the plurality of corresponding battery units is currently capable of supplying power to the at least one of the plurality of computing devices;
    a customer account associated with the at least one of the plurality of computing devices;
    a customer account associated with the at least one of the plurality of corresponding battery units;
    a geographic location associated with the at least one of the plurality of computing devices;
    a geographic location associated with the at least one of the plurality of corresponding battery units;
    at least one communication channel for communicating with the at least one of the plurality of computing devices or the at least one of the plurality of corresponding battery units;
    whether the communication channel is currently available;
    how to address commands via the communication channel.

14. The computer-implemented method of claim 13, wherein maintaining the database comprises at least one of:
    receiving at least a portion of the customer information from the at least one of the plurality of computing devices;
    receiving at least a portion of the customer information from the at least one of the plurality of corresponding battery units;
    receiving at least a portion of the customer information from an administrator;
    receiving at least a portion of the customer information from a customer.

15. A computer-implemented method for reducing power draw on a power grid by drawing power from alternate power sources, the method comprising:
    identifying, at a module installed on a computing device, a power grid from which the computing device is currently drawing power;
    notifying, via the module installed on the computing device, a management device managed by an entity that supplies power via the power grid that the computing device is capable of, but is not currently, drawing power from at least one battery unit to enable the management device to maintain a database that identifies the computing device drawing power from the power grid and the battery unit currently capable of providing power to the computing device;
    providing, via the module installed on the computing device, the management device managed by the entity that supplies power via the power grid with customer information to store in the database, the customer information comprising:
        a description of the computing device;
        a description of the battery unit;
        a time when the computing device draws power;
        an amount of power required by the computing device;
    receiving, at the module installed on the computing device, a command from the management device managed by the entity that supplies power via the power grid to reduce the computing device's draw on the power supplied by the entity via the power grid by simultaneously drawing power from the power grid and the battery unit at a ratio based on an analysis of the customer information by the management device;
    in response to the command received from the management device:
        identifying, at the module installed on the computing device, the battery unit;
        causing, at the module installed on the computing device, the computing device to reduce the computing device's draw on the power supplied by the entity via the power grid by simultaneously drawing power from the power grid and the battery unit at the ratio based on the management device's analysis of the customer information.

16. The computer-implemented method of claim 15, further comprising, prior to receiving the command from the management device to simultaneously draw power from the power grid and the battery unit at the ratio, transmitting, from the module installed on the computing device to the management device, a request to draw power from the battery unit.

17. The computer-implemented method of claim 15, further comprising, prior to notifying the management device:
   determining that the computing device is capable of drawing power from the battery unit;
   determining that the battery unit is capable of providing power to the computing device.

18. The computer-implemented method of claim 15, further comprising:
   maintaining a local database that contains information that identifies at least one of:
      the computing device;
      the amount of power required by the computing device;
      an amount of power that the battery unit is capable of supplying;
      a schedule of when the computing device draws power;
      geo-location information associated with the computing device;
      geo-location information associated with the battery unit;
   compiling, based on the local database, a local-power-requirements report;
   transmitting the local-power-requirements report to the power grid.

19. A system for using alternate power sources to manage power draw on a power grid, the system comprising:
   a power-management module programmed to:
      maintain, at a management device managed by an entity that supplies power via the power grid, a database that identifies a plurality of computing devices drawing power from the power grid and a plurality of corresponding battery units currently capable of providing power to the plurality of computing devices;
      store customer information for each of a plurality of customers in the database, the customer information comprising:
         a description of a customer's computing device;
         a description of a corresponding battery unit;
         a time when the customer's computing device draws power;
         an amount of power required by the customer's computing device;
      identify, at the management device managed by the entity that supplies power via the power grid, a need to reduce the power draw on the power grid;
      identify, by analyzing the customer information at the management device managed by the entity that supplies power via the power grid, that at least one of the plurality of computing devices is drawing power from the power grid;
      determine, by analyzing the customer information at the management device managed by the entity that supplies power via the power grid, that the at least one of the plurality of computing devices is capable of, but is not currently, drawing power from at least one of the plurality of corresponding battery units;
      determine, based at least in part on the customer information at the management device managed by the entity that supplies power via the power grid, at least one ratio for the at least one of the plurality of computing devices to draw power simultaneously from both the power grid and the at least one of the plurality of corresponding battery units; and
   a communication module programmed to transmit, from the management device managed by the entity that supplies power via the power grid to a module installed on the at least one of the plurality of computing devices, at least one command that, when executed, causes the at least one of the plurality of computing devices to reduce the drawing of power from the power grid by simultaneously drawing power from both the power grid and the at least one of the plurality of corresponding battery units at the ratio; and
   at least one processor configured to execute the power-management module and the communication module.

20. The system of claim 19, wherein the database contains further information concerning the power supplied by the power grid.

* * * * *